(12) United States Patent
Bae et al.

(10) Patent No.: US 12,076,970 B2
(45) Date of Patent: Sep. 3, 2024

(54) TWO SHOT MOLDING WITH ISOSORBIDE BASED POLYCARBONATE

(71) Applicant: GM Global Technology Operations LLC, Detroit, MI (US)

(72) Inventors: Woo-Sung Bae, Northville, MI (US); Bradley J. Tice, Warren, MI (US); Guy D. Larouche, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/056,377

(22) Filed: Nov. 17, 2022

(65) Prior Publication Data

US 2024/0173939 A1 May 30, 2024

(51) Int. Cl.
| | |
|---|---|
| *B32B 7/022* | (2019.01) |
| *B29C 45/16* | (2006.01) |
| *B32B 27/08* | (2006.01) |
| *B32B 27/36* | (2006.01) |
| *B29K 69/00* | (2006.01) |
| *B29L 31/30* | (2006.01) |

(52) U.S. Cl.
CPC .............. *B32B 7/022* (2019.01); *B29C 45/16* (2013.01); *B32B 27/08* (2013.01); *B32B 27/365* (2013.01); *B29K 2069/00* (2013.01); *B29K 2995/007* (2013.01); *B29L 2031/3005* (2013.01); *B32B 2307/536* (2013.01); *B32B 2307/732* (2013.01); *B32B 2605/00* (2013.01)

(58) Field of Classification Search
CPC ....... B32B 7/022; B32B 27/08; B32B 27/365; B32B 2307/536; B32B 2307/735; B32B 2605/00; B29C 45/16; B29K 2069/00; B29K 2995/007; B29L 2031/3005
See application file for complete search history.

(56) References Cited

U.S. PATENT DOCUMENTS

| | | | |
|---|---|---|---|
| 2009/0252969 A1* | 10/2009 | Tamura | B29C 45/2669 425/549 |
| 2020/0101705 A1* | 4/2020 | Sakamoto | B29C 45/1671 |
| 2021/0253788 A1* | 8/2021 | Namiki | B32B 27/32 |

OTHER PUBLICATIONS

Team Xometry, PC-ABS: Polycarbonate Material Properties, 2022, Team Xometry, pp. 1-11 (Year: 2022).*

* cited by examiner

*Primary Examiner* — Maria V Ewald
*Assistant Examiner* — Ethan Weydemeyer
(74) *Attorney, Agent, or Firm* — Vivacqua Crane, PLLC

(57) ABSTRACT

A vehicle trim component, a vehicle including a vehicle trim component, and method of making a vehicle trim component. The vehicle trim component includes a substrate including a first polymer. The substrate includes a first surface, and the first polymer includes bisphenol-A based polycarbonate. The vehicle trim component also includes an exterior layer including a second polymer. The second polymer includes isosorbide-based polycarbonate. The exterior layer includes an exterior surface, and the exterior layer is laminated to the first surface of the substrate.

20 Claims, 3 Drawing Sheets

TWO SHOT MOLDING WITH ISOSORBIDE BASED POLYCARBONATE

BACKGROUND

A number of automotive components, used in both exterior and interior applications, are formed from bisphenol-A (BPA) polycarbonate and BPA polycarbonate blends, such as BPA polycarbonate with acrylonitrile butadiene styrene (ABS). BPA polycarbonates and BPA polycarbonate blends, however, generally exhibit limited weatherability performance. Depending on exposure to ultraviolet light and weathering conditions in a given application, surfaces formed from BPA polycarbonate and BPA polycarbonate blends often include a coat of paint to improve weatherability. Paints also often provide a relatively hard surface of HB or harder on the pencil hardness scale, which improves scratch resistance. However, painting adds an additional step that increases process time due the need to dry or cure the paint.

Accordingly, while current automotive components produced from BPA polycarbonate and BPA polycarbonate blends achieve their intended purpose, there is a need for new and improved materials, processes and systems for forming automotive components.

SUMMARY OF THE INVENTION

According to various aspects, the present disclosure is directed to a vehicle trim component. The vehicle trim component includes a substrate including a first polymer. The substrate includes a first surface. The first polymer includes bisphenol-A based polycarbonate. The vehicle trim component also includes an exterior layer including a second polymer. The second polymer includes isosorbide-based polycarbonate. The exterior layer includes an exterior surface, and the exterior layer is laminated to the first surface of the substrate.

In embodiments, the exterior surface is a Class-A surface.

In embodiments of the above, the first polymer is a blend of bisphenol-A polycarbonate and acrylonitrile butadiene styrene.

In any of the above embodiments, the first polymer exhibits a first hardness, and the second polymer exhibits a second hardness and the second hardness is greater than the first hardness.

In any of the above embodiments, the substrate exhibits a first thickness and the exterior layer exhibits a second thickness that is less than the first thickness.

In any of the above embodiments, the adhesive is not present between the substrate and exterior layer.

In any of the above embodiments, the exterior layer includes colorants. In further embodiments, the exterior surface does not include paint.

In any of the above embodiments, the vehicle trim component is an interior trim component. In further embodiments, the interior trim component is selected from the group consisting of: instrument panel cluster, internal control systems, gear shift panel, and interior door trim.

In any of the above embodiments, the vehicle trim component is an exterior vehicle trim component. In further embodiments, the vehicle trim component is selected from the group consisting of: grill, exterior door trim, and mirror trim.

According to various aspects, the present disclosure relates to a vehicle. The vehicle includes the vehicle trim components according to the various aspects described above. The vehicle trim component includes a substrate including a first polymer. The first polymer includes a bisphenol-A based polycarbonate polymer, and the substrate includes a first surface. The vehicle trim component also includes an exterior layer including a second polymer, wherein the second polymer is an isosorbide-based polycarbonate. The exterior layer is laminated to the first surface of the substrate.

In embodiments, the substrate exhibits a first thickness and the exterior layer exhibits a second thickness, wherein the second thickness is less than the first thickness. In further embodiments, the substrate exhibits a first hardness and the exterior layer exhibits a second hardness, wherein the first hardness is less than the second hardness.

In embodiments of the above, the exterior layer includes colorants.

In any of the above embodiments, the vehicle trim component is on the exterior of the vehicle.

In any of the above embodiments, the vehicle trim component is in the interior of the vehicle.

According to various aspects, the present disclosure relates to a method of forming a vehicle trim component. The method includes molding a substrate from a first polymer. The substrate includes a first surface and the first polymer include a bisphenol-A based polycarbonate. The method further includes molding an exterior layer of a second polymer. The exterior layer includes a rear surface and the first surface of the substrate is laminated to the rear surface of the exterior layer. The second polymer includes isosorbide-based polycarbonate polymer.

In embodiments of the above, the exterior layer and the substrate bond without an adhesive.

In embodiments of the above, the substrate and exterior layer are injection molded using a two-shot molding process.

BRIEF DESCRIPTION OF DRAWINGS

The drawings described herein are for illustration purposes only and are not intended to limit the scope of the present disclosure in anyway.

DETAILED DESCRIPTION OF THE INVENTION

Figure 1A:
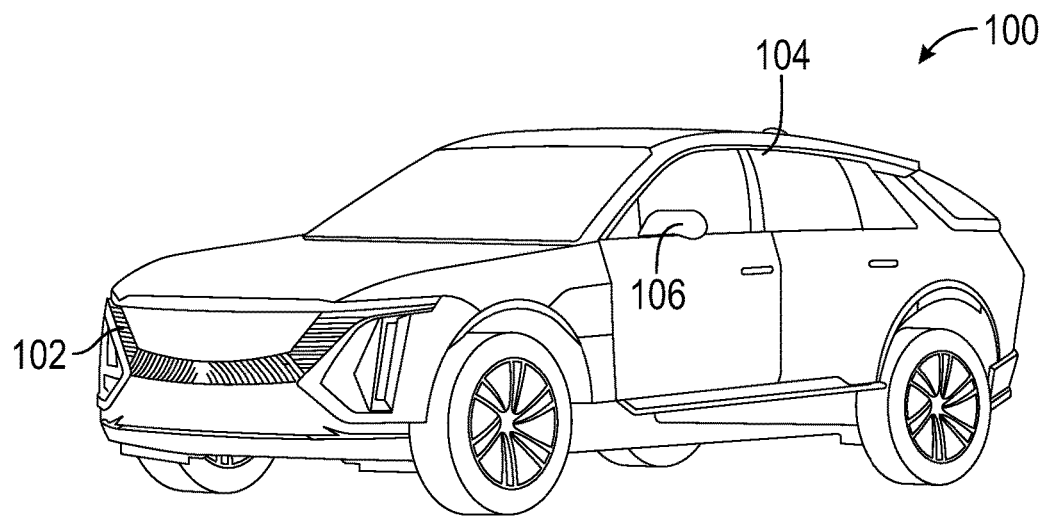
FIG. 1A illustrates a vehicle exterior of an exemplary vehicle according to aspects of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, or other structural or non-structural molded components. Applications include, for example, vehicle trim components, including Class A-surfaces, such as the door trim, integrated center stack (ICS), instrument panel (IP) cluster, gear shift panel, cup holder, pillar, grill, etc., and include those surfaces that are visible on both the exterior and in the interior of the vehicle.

Figure 1B:
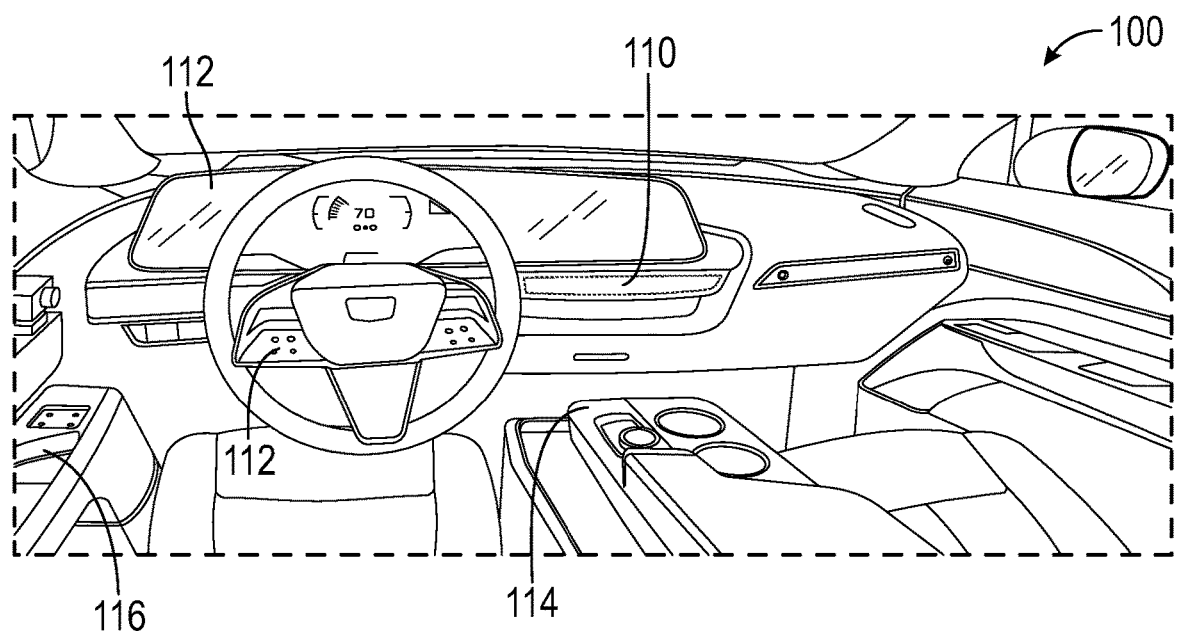
FIG. 1B illustrates a vehicle interior of an exemplary vehicle according to aspects of the present disclosure.

The present disclosure is directed to vehicle trim components and a method of making vehicle trim components. Class-A vehicle trim components are understood herein as components that are visible in the interior, i.e., passenger compartment, and on the exterior of the vehicle. Such trim components include, but are not limited to, door trim, integrated center stack (ICS) packaging, instrument panel (IP) clusters, gear shift panels, door handles, cup holder, pillar, and grill. FIG. 1A illustrates the exterior of a vehicle 100, including vehicle trim components, such as the grill 102, exterior pillar appliques 104 (including appliques for pillars A, B, C and D when present), and mirror trim 106 as well as side aero appliques and shark fin antenna. FIG. 1B illustrates the interior of a vehicle 100, including vehicle trim components, such as the integrated center stack 110, the internal control systems 112, the gear shift panel 114, and interior door trim 116, as well as infotainment controls, buttons and switches.

Figure 2:
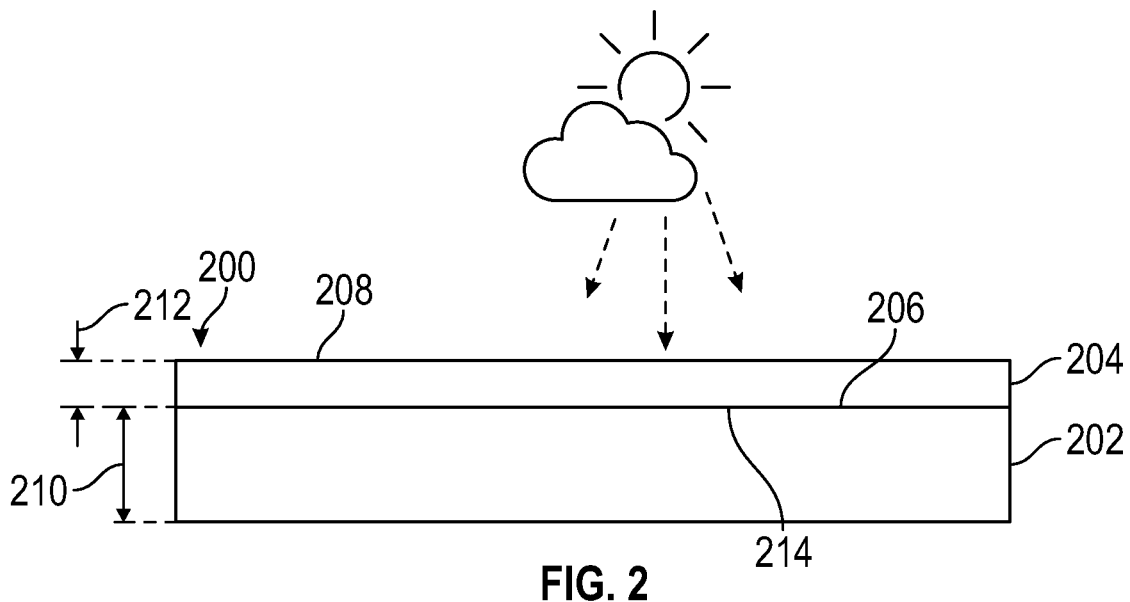
FIG. 2 illustrates a vehicle trim component according to embodiments of the present disclosure.

As illustrated in FIG. 2, the vehicle trim components 200 include two layers, a substrate 202 and an exterior layer 204. The exterior layer 204 is laminated to a first surface 206 the substrate 202. The exterior surface 208 of the exterior layer 204 provides a Class-A surface and is at least partially visible to an observer in the interior or around the exterior of the vehicle 100. The substrate 202 exhibits a first thickness 210 and the exterior layer 204 exhibits a second thickness 212. In embodiments, the second thickness is less than the first thickness 206. In embodiments, the exterior layer 204 is co-extensive with the substrate. In alternative embodiments, the exterior layer 204 and substrate 202 are not coextensive and the exterior layer 204 does not laminate the entire first surface of the substrate or extends past the periphery of the first surface 206 of the substrate 202.

The substrate 202 is formed from a first polymer. The first polymer includes a bisphenol-A based polycarbonate alone or a blend of bisphenol-A based polycarbonate with one or more additional polymers. The polymer structure of the bis-phenol-A based polycarbonate is generally represented by formula (1).

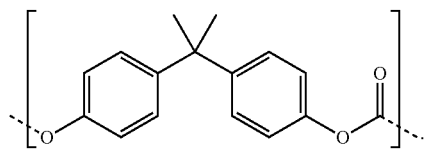

Formula 1

Polymers the bisphenol-A based polycarbonate may be blended with include one or more of: acrylonitrile butadiene styrene (ABS), acrylonitrile styrene acrylate (ASA), polybutylene terephthalate (PBT) or polymethyl methacrylate (PMMA). In embodiments, the bisphenol-A based polycarbonate is blended with acrylonitrile butadiene styrene at a polycarbonate to ABS weight ratio in the range of 50 to 50 to 75 to 25, including all values and ranges therein, such as 70 to 30. In embodiments, the molecular specific gravity is in the range of 1.0 to 1.3 including all values and ranges therein, such as 1.05 to 1.20, for unfilled blends of bisphenol-A based polycarbonate and acrylonitrile butadiene styrene used in the first polymer.

In embodiments, various additives are incorporated into the first polymer. The additives include one or more of mineral and glass additives. Mineral additives include, for example, calcium carbonate, talc, silica, wollastonite, clay, calcium sulfate, mica, and aluminum trihydrate. Glass additives include, for example, glass fibers and glass microspheres.

The exterior layer 204 is formed from a second polymer. The second polymer is isosorbide-based polycarbonate. The exterior layer 204 is formed from a polycarbonate formed from isosorbide, referred to herein as an isosorbide-based polycarbonate, the isosorbide exhibiting the following general formula, formula 2.

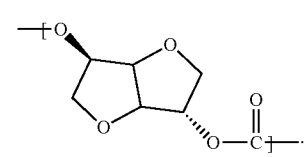

Formula 2

When desired, the second, isosorbide-based polycarbonate polymer incorporates colorants, such as dyes and pigments, including, for example, metallic flake and mica providing visual effects to the vehicle trim component. Accordingly, it should be appreciated that the use of the isosorbide-based polycarbonate eliminates the need for paint that may otherwise be applied to components where the first polymer provides the exterior surface 208 of the vehicle trim component. The bisphenol-A based polycarbonate may also include various colorants, such as dyes and pigments as well as various forms fillers such as metallic flake and clay.

In embodiments, various additives are also incorporated into the second polymer. The additives include one or more of mineral and glass additives. Mineral additives include, for example, calcium carbonate, talc, silica, wollastonite, clay, calcium sulfate, mica, and aluminum trihydrate. Glass additives include, for example, glass fibers and glass microspheres.

The first polymer including the bisphenol-A based polycarbonate (alone or blended with one or more additional polymers) exhibits a first density and the second, isosorbide-based polycarbonate polymer exhibits a second density, wherein the first density is less than the second density as measured according to ISO 1183:1-2019. In addition, the first polymer exhibits a first impact strength, and the second polymer exhibits a second impact strength, wherein the first impact strength is greater than that of the second impact strength as measured by ASTM D3763-18, Specimen C 100 mm×100 mm×3.2 mm at 23° C. at a speed of 6.6 m/s. The first polymer also exhibits a first heat deflection temperature and the second polymer exhibits a second heat deflection temperature, wherein the first heat deflection temperature is greater than the second as measured by Vicat softening point according to ISO 306:2013. Further, in embodiments, the first polymer exhibits a first hardness measured by the pencil test, and the second polymer exhibits a second hardness measured by the pencil test, wherein the first hardness is less than the second hardness as measured according to ISO 15184:2020. In embodiments, the first polymer also exhibits a refractive index of a first refractive index and the second polymer exhibits a second refractive index, wherein the first refractive index is greater than the second refractive index, as measured by ASTM D542.

In embodiments of the above, bisphenol-A based polycarbonate exhibits a density in the range of 1.0 to 1.30 grams per cubic centimeters (g/cm$^3$), including all values and ranges therein, as measured by ISO 1183:1-2019, such as 1.18 g/cm$^3$ to 1.22 g/cm$^3$. In addition, the bisphenol-A based polycarbonate exhibits an impact strength, measured by Dart drop, of 30 Joules to 70 Joules, including all values and ranges therein, such as 30 Joules to 50 Joules, as measured by Multiaxial Impact per ASTM D3763, Specimen C 100 mm×100 mm×3.2 mm at 23° C. at a speed of 6.6 m/s. Further, the bisphenol-A based polycarbonate exhibits a Vicat softening point in the range of 135° C. to 187° C., as measured by ISO 306:2013, including all values and ranges therein. The melt flow index of the bisphenol-A based polycarbonate is in the range of 8 grams per 10 minutes to 25 grams per 10 minutes, as measured by ISO1133 at 300° C. and 1.2 kg load, including all values and ranges therein. In addition, the hardness of bisphenol-A based polycarbonate 3B as measured by the pencil test, as measured by ISO 15184:2020. The bisphenol-A based polycarbonate also exhibits a refractive index of 1.56 to 1.60, including all values and ranges therein, as measured by ASTM D542.

Further, in embodiments, bisphenol-A based polycarbonate blended with acrylonitrile butadiene styrene (BPA-PC/ABS blend) exhibits a density in the range of 1 g/cm$^3$ to 1.15 g/cm$^3$, including all values and ranges therein, as measured by ISO 1183:1-2019. In addition, the BPA-PC/ABS blend exhibits an impact strength, measured by Dart drop, of 30 Joules to 50 Joules, including all values and ranges therein, such as 40 Joules to 45 Joules, as measured by Multiaxial Impact per ASTM D3763, Specimen C 100 mm×100 mm×3.2 mm at 23° C. at a speed of 6.6 m/s. Further, the BPA-PC/ABS blend exhibits a Vicat softening point in the range of in the range of 100° C. to 140° C., as measured by ISO 306:2013, including all values and ranges therein.

In embodiments of the above, isosorbide-based polycarbonate exhibits a density in the range of 1.29 to 1.41 grams per cubic centimeters (g/cm$^3$), including all values and ranges therein, as measured by ISO 1183:1-2019. In addition, the isosorbide-based blend exhibits an impact strength, measured by Dart drop, of 30 Joules to 50 Joules, including all values and ranges therein, such as 40 Joules to 45 Joules, as measured by Multiaxial Impact per ASTM D3763, Specimen C 100 mm×100 mm×3.2 mm at 23° C. at a speed of 6.6 m/s. The isosorbide-based polycarbonate also exhibits a refractive index of 1.48 to 1.52, including all values and ranges therein, as measured by ASTM D542. The isosorbide-based polycarbonate exhibits a total luminance transmittance, as measured by ISO-13468, of greater than 60%, and up to 98%. Further, the isosorbide-based polycarbonate exhibits a Vicat softening point in the range of 105° C. to 115° C., as measured by ISO 306:2013, including all values and ranges therein. The melt flow index of the bisphenol-A based polycarbonate is in the range of 10 grams per 10 minutes to 15 grams per 10 minutes, as measured by ISO1133 at 230° C. and 2.16 kg. In addition, the hardness of isosorbide-based polycarbonate F to HB as measured by the pencil test, as measured by ISO 15184:2020.

It should be appreciated that the bonding reduces the possibility of delamination of the exterior layer 204 from the substrate 202. Due to the compatibility of the polymer materials, an adhesive, or bonding agent, is not necessary between the substrate 202 and exterior layer 204 to prevent delamination and is omitted in embodiments.

Figure 3:
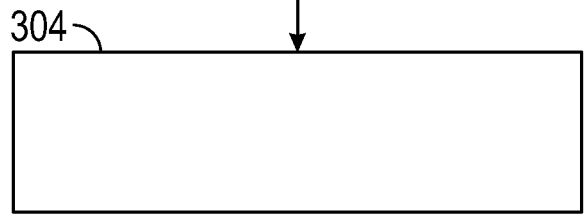
FIG. 3 illustrates a method of forming a vehicle trim component according to embodiments of the present disclosure.

The vehicle trim component is formed using a multi-material molding process 300, generally illustrated in FIG. 3 and with further reference to FIG. 2. At block 302, the process begins with molding the substrate 202. Molding the substrate 202 includes melting the first polymer including bisphenol-A based polycarbonate, to a molten state, or at least a semi-molten state, through the application of heat and pressure in an injection molding machine barrel or extruder. The first polymer is then introduced into a mold cavity, where it is formed into the shape of the substrate. The first polymer then cools in the mold cavity, and in embodiments cools below the heat deflection temperature at 1.8 MPa. Then, at block 304, the exterior layer 204 is molded on the substrate 202. Like molding the first polymer, molding the second polymer includes melting the polymer to a molten state, or at least a semi-molten state, through the application of heat and pressure through plastication in an injection molding machine barrel or an extruder. The second polymer is then introduced into a mold cavity and molded over the substrate, where it is formed into the shape of the exterior layer of the component. As may be appreciated, the substrate provides a portion of the cavity for forming the exterior layer with the second polymer. The second polymer laminates to the first polymer of the substrate.

Figure 4:
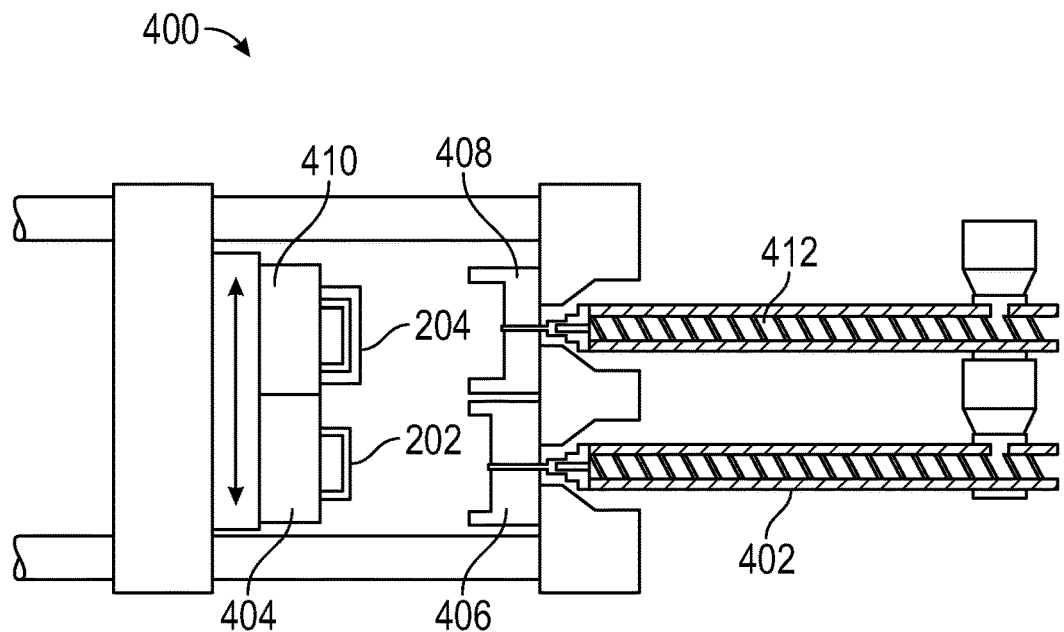
FIG. 4 illustrates a system for forming a vehicle trim component according to embodiments of the present disclosure.

In various embodiments, the multi-material process 300 is executed using a two-shot molding process, illustrated in FIG. 4 with reference to FIG. 2. In two shot molding, the substrate 202 is molded first by applying heat and pressure the first polymer in a first injection barrel 402 in a two-shot injection molding machine 400. Heating and applying pressure to the first polymer, reduces the viscosity of the first polymer to a semi-molten, or molten, state. The first polymer is then injected, as a first shot, under pressure out of the first injection barrel 402 and into a first mold cavity defined by a first rotating mold half 404 and a first stationary mold half 406, which are often held at a cooler temperature than the temperature of the melt of the first polymer. This process forms the substrate 202, such as the substrate 202 illustrated in FIG. 5A. The first polymer begins to cool in the cavity and the first polymer begins to solidify.

Figures 5A, 5B:
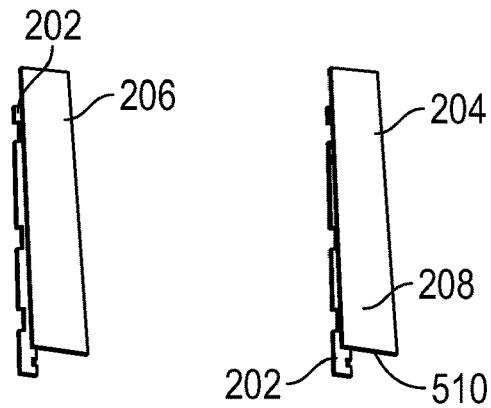
FIG. 5A illustrates a substrate molded as a first shot in a two-shot process according to embodiments of the present disclosure.
FIG. 5B illustrates an exterior layer molded onto the substrate illustrated in FIG. 5A as a second shot in a two-shot process according to embodiments of the present disclosure.

The first rotating mold half 404 is then rotated to a second position and the substrate 202 and a second stationary mold half 408 define a second cavity. The second polymer is melted under heat and pressure in a second injection barrel 412 and injected, as a second shot, into the second cavity to form the exterior layer 204 as illustrated in FIG. 5B. The exterior layer 204 laminates to at least a portion of the first surface 206 of the substrate 202. In further embodiments, the two-shot machine includes a second rotary cavity 410 allowing the formation of both a substrate 202 and exterior layer 204 at the same time. The vehicle trim components are then ejected from the molding machine.

When the substrate 202 is molded first, the substrate 202 prevents placing a gate, i.e., an opening in the mold that allows the polymer to pass into the second cavity, on the rear surface of the exterior layer 204. With reference again to FIG. 5B, it is noted that to prevent marring of the exterior surface 208 of the exterior layer 204, an edge gate 510 may be used to inject the second polymer into the second cavity. In this manner, the edge gate 510 is not visible at the exterior surface 208. Depending on where the edge gate 510 is placed, the polymer must flow at least half the length, if not the entire length of the exterior layer 204, it may become difficult to for the polymer to fill out the exterior layer 204.

Figures 6A, 6B:
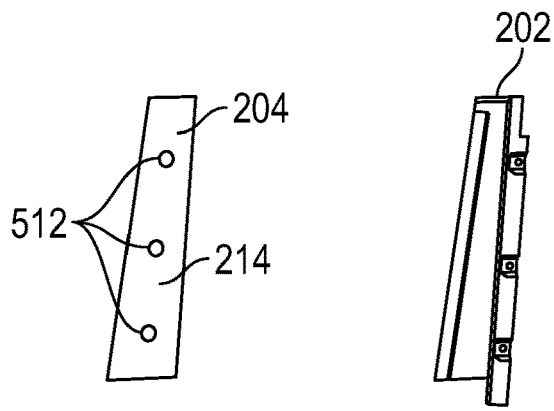
FIG. 6A illustrates an exterior layer molded as a first shot in a two-shot process according to embodiments of the present disclosure.
FIG. 6B illustrates a substrate molded over the exterior layer as illustrated in FIG. 6A as a second shot in a two-shot process according to embodiments of the present disclosure.

Alternatively, the exterior layer 204 may be formed first and the substrate 202 is molded and laminated to the exterior layer 204 in a reverse injection, two-shot process. The exterior layer 204 is molded first, in the first shot. As illustrated in FIG. 6A, one or more gates 512 may be formed along the rear surface 214 of the exterior layer 204, reducing the length of the flow path of the polymer within the cavity. As illustrated in 6B, the substrate 202 is then molded and laminated onto the rear surface 214 of the exterior layer 204. Moving the gates 510 to the rear surface 214 of the exterior layer 204 was found to improve the exterior surface 208 of the exterior layer 204. The shorter flow path reduces the molded-in stress in the exterior layer 204, which may reduce birefringence. Further, this arrangement allows increased dimensional stability and sun load performance.

Several advantages are offered by the vehicle trim components described herein. These advantages include the leveraging of the relatively greater mechanical and higher thermal properties of the lower cost bisphenol-A based first polymer with the hardness and weatherability of the second, relatively more expensive isosorbide-based polycarbonate to improve the hardness, and therefore scratch-resistance, and weatherability of exterior surface of the vehicle trim component, while maintaining the mechanical and thermal integrity of the component. In addition, the first polymer reduces the overall weight of the component given the relatively lower density of bisphenol-A based polycarbonate and blends of bisphenol-A based polycarbonate with, e.g., acrylonitrile-butadiene styrene, in comparison to the isosorbide-based polycarbonate. A further advantage is that it is not necessary to apply an adhesive or bonding agent between the first polymer and second polymer layers. Yet a further advantage is that the isosorbide-based polycarbonate polymer negates the need for a paint layer, which would otherwise be applied over a bisphenol-A based polycarbonate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A vehicle trim component, comprising:
 a substrate comprising a first polymer, the substrate including a first surface and the first polymer includes bisphenol-A based polycarbonate; and
 an exterior layer comprising a second polymer, wherein the second polymer includes isosorbide-based polycarbonate, the exterior layer includes an exterior surface, a rear surface, and a periphery defined by the rear surface, and the exterior layer is laminated to the first surface of the substrate, wherein one or more gates for molding the exterior layer is formed along the rear surface spaced away from the periphery.

2. The vehicle trim component of claim 1, wherein the exterior surface is a Class-A surface.

3. The vehicle trim component of claim 1, wherein the first polymer is a blend of bisphenol-A polycarbonate and acrylonitrile butadiene styrene, and the first polymer exhibits a density in the range of 1 g/cm$^3$ to 1.15 g/cm$^3$ and a Vicat softening point in the range of 100° C. to 140° C.

4. The vehicle trim component of claim 1, wherein the first polymer exhibits a first hardness and the second polymer exhibits a second hardness, and the second hardness is greater than the first hardness.

5. The vehicle trim component of claim 4, wherein the substrate exhibits a first thickness, and the exterior layer exhibits a second thickness, and the second thickness is less than the first thickness.

6. The vehicle trim component of claim 4, wherein an adhesive is not present between the substrate and the exterior layer.

7. The vehicle trim component of claim 4, wherein the exterior layer includes a colorant.

8. The vehicle trim component of claim 7, wherein the exterior layer does not include paint on the exterior surface.

9. The vehicle trim component of claim 4, wherein the vehicle trim component is an interior trim component.

10. The vehicle trim component of claim 9, wherein the interior trim component is selected from the group consisting of: instrument panel cluster, internal control systems, gear shift panel, and interior door trim.

11. The vehicle trim component of claim 3, wherein the vehicle trim component is an exterior vehicle trim component.

12. The vehicle trim component of claim 11, wherein the exterior vehicle trim component is selected from the group consisting of: grill, exterior door trim, and mirror trim.

13. A vehicle comprising:
 a vehicle trim component, including:
 a substrate including a first polymer, wherein the first polymer includes a blend of bisphenol-A based polycarbonate and acrylonitrile butadiene styrene, wherein the first polymer exhibits a density in the range of 1 gram per cubic centimeter to 1.15 grams per cubic centimeter and a Vicat softening point in the range of 100° C. to 140° C., and the substrate includes a first surface; and
 an exterior layer including a second polymer, wherein the second polymer is isosorbide-based polycarbonate, and the exterior layer is laminated to the first surface of the substrate, wherein the exterior layer includes an exterior surface, a rear surface, and a periphery defined by the rear surface, and one or more gates for molding the exterior layer is formed along the rear surface spaced away from the periphery.

14. The vehicle of claim 13, wherein the substrate exhibits a first thickness and the exterior layer exhibits a second thickness, wherein the second thickness is less than the first thickness; and the substrate exhibits a first hardness and the exterior layer exhibits a second hardness, wherein the first hardness is less than the second hardness.

15. The vehicle of claim 14, wherein the exterior layer includes a colorant.

16. The vehicle of claim 15, wherein the vehicle trim component is on the exterior of the vehicle.

17. The vehicle of claim 15, wherein the vehicle trim component is in the interior of the vehicle.

18. A method of forming a vehicle trim component, comprising:
- molding a substrate from a first polymer, wherein the substrate includes a first surface and the first polymer includes a blend of bisphenol-A based polycarbonate and acrylonitrile butadiene styrene, wherein the first polymer exhibits a density in the range of 1 gram per cubic centimeter to 1.15 grams per cubic centimeter and a Vicat softening point in the range of 100° C. to 140° C.; and
- molding an exterior layer of a second polymer, wherein the exterior layer includes an exterior surface, a rear surface, and a periphery defined by the rear surface, and the first surface of the substrate is laminated to the rear surface of the exterior layer, wherein the second polymer includes isosorbide-based polycarbonate polymer and wherein one or more gates for molding the exterior layer is formed along the rear surface spaced away from the periphery.

19. The vehicle trim component of claim 1, wherein at least one of the first polymer and the second polymer includes an additive selected from the group consisting of mineral and glass.

20. The vehicle trim component of claim 1, wherein a gate for molding the second polymer is located at an edge.

* * * * *